Oct. 19, 1954     A. J. WEATHERHEAD, JR     2,691,988
SEALED PRESSURE REGULATOR
Filed June 21, 1950
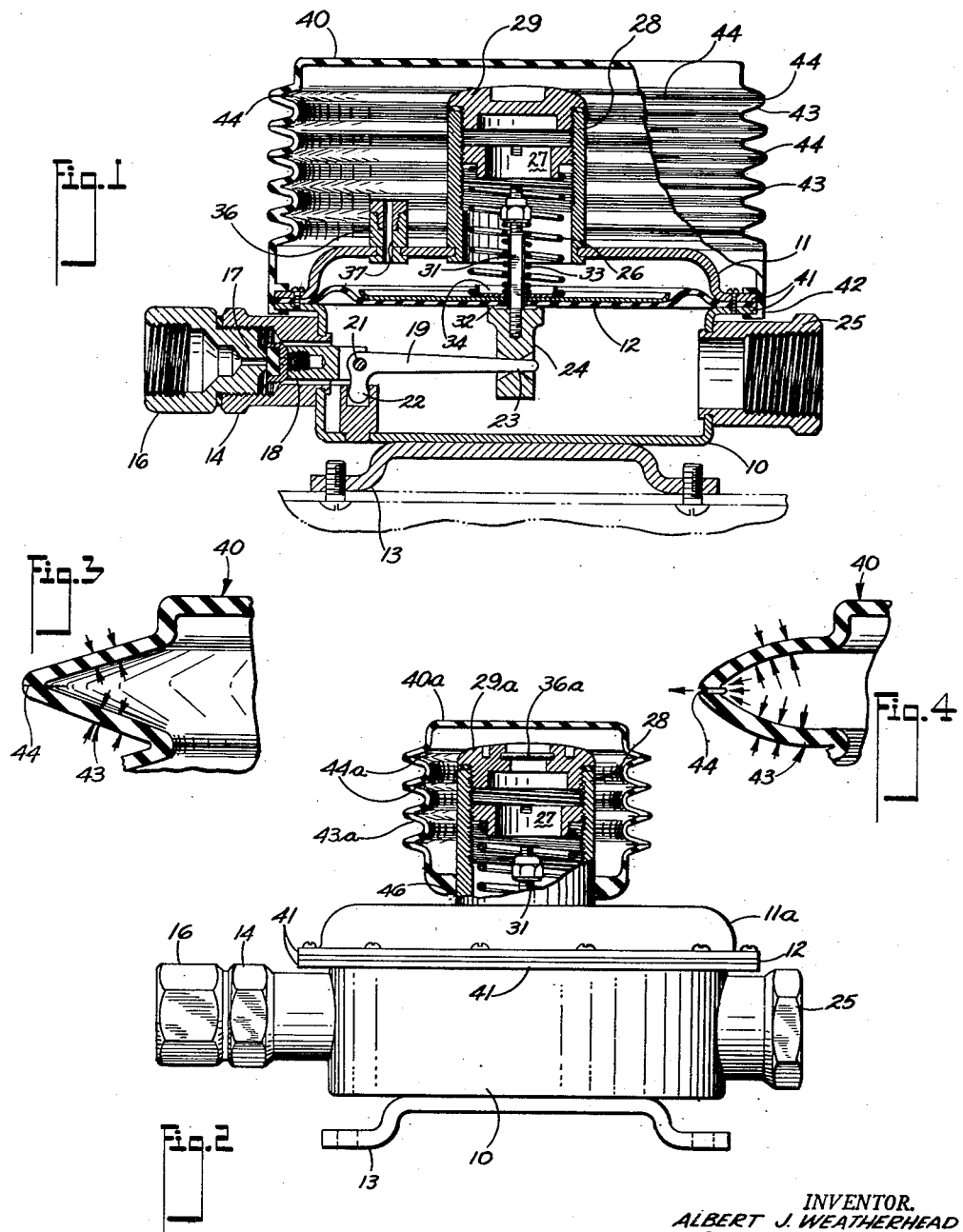
INVENTOR.
ALBERT J. WEATHERHEAD
BY *Richey & Watts*
ATTORNEYS Patented Oct. 19, 1954

2,691,988

UNITED STATES PATENT OFFICE 2,691,988

SEALED PRESSURE REGULATOR

Albert J. Weatherhead, Jr., Shaker Heights, Ohio, assignor to The Weatherhead Company, Cleveland, Ohio, a corporation of Ohio Application June 21, 1950, Serial No. 169,330

5 Claims. (Cl. 137—377)

This invention relates to pressure regulators, and is directed to a sealed pressure regulator arranged to function without interference from dirt, moisture, ice, or sleet, even if the regulator is installed in an exposed position.

Pressure regulators and pressure reducers of the type having a chamber partly defined by a flexible diaphragm or its equivalent, an inlet port and outlet ports, a valve for one of the ports connected to the diaphragm, have a variety of uses in the fluid distribution art. For example, in the liquefied petroleum gas industry, such pressure regulators are widely employed to reduce pressures from a high pressure source such as a tank, and many of such regulators are necessarily paritally or completely exposed to the elements.

It is usually desirable to open the exterior of the regulator diaphragm to atmospheric pressure so that the regulator will be biased against atmospheric pressure, that is, atmospheric pressure will be the reference pressure. Since the diaphragms are usually quite delicate in order to gain sensitivity, it is desirable that they be protected from mechanical damage. To accomplish the aforesaid objectives, the diaphragm, that is the external surface thereof, is housed by a container or cap which serves to protect the diaphragm from damage, and which, one way or another, contains one or more vent apertures to provide the aforesaid atmospheric reference pressure on the diaphragm.

The aforesaid construction has presented numerous difficulties. As the diaphragm flexes due to the action of the regulator, air is aspirated into and expelled from the atmospheric chamber thereof, which makes it possible for dirt and moisture to collect in said chamber. Of course, both of these conditions are undesirable, and the presence of moisture presents an additional difficulty in that often due to expansion of the gas in the regulator, the temperature of the latter is depressed so that the moisture within the atmospheric chamber freezes and interferes with the flexibility of the diaphragm. Of course, the same freezing action may be encountered due to a low atmospheric temperature. Difficulty is also encountered with the vents for the atmospheric chamber which may be plugged with dirt or clogged with ice or sleet.

The principal object of the invention resides in sealing the diaphragm, and its protective housing if present, from the intrusion of foreign matter, dirt, moisture, or the like, and at the same time, without interfering with the operation of the regulator diaphragm, and providing a pressure bias for the diaphragm which is equal, or substantially equal, to atmospheric pressure. This is accomplished by enclosing the atmospheric side of the regulator with a normally sealed or air impervious member that encompasses a relatively large volume of air, which member is flexible or otherwise arranged to be self-adjusting as to volume in response to changes in pressure, either internal or external.

In the preferred form of the invention the regulator includes a sealing member in the form of a thin boot of rubber, or rubber-like material, preferably ribbed or corrugated to augment its flexibility, said boot being retained in sealing engagement with some portion of the regulator body. Such a boot is sensitive to variations of atmospheric pressure so that corresponding variations occur within the boot, and due to its light, flexible construction, the boot can substantially follow fluctuations of the diaphragm of the regulator to maintain a substantially constant volume of enclosed air whereby the reference pressure does not change due to the fluctuations of the regulator diaphragm. In addition, should sleet or ice form on the boot, such sleet or ice will be cracked or flaked off by the constant pulsation of the boot as it follows the pulsations of the regulator diaphragm or as it follows changes in atmospheric pressure.

Many regulators provide pressure release means between the fluid chamber and atmosphere in order to protect the diaphragm from rupture in case excess pressure develops in the fluid chamber. In a typical construction, the diaphragm operating post incorporates a relief valve spring loaded to pass fluid around the post when pressure reaches a predetermined value within the gas chamber. With this construction it is desirable that the sealing boot be arranged to permit the exhaust of the released fluid. In the preferred embodiment of the invention this is accomplished by slitting the boot at one or more places in the ribs or corrugated portions thereof so that under normal operation the resiliency of the material of the boot closes the slits. However, under excess pressure the material of the boot may be stretched to open the slits and relieve such pressure. Alternately, the boot mounting may be so arranged that it will be detached from the regulator body when pressure release occurs, although this construction is not as desirable in that the boot must be replaced when operation of the valve is resumed.

The manner in which the aforesaid objects and advantages may be accomplished will be apparent from the following detailed description of a preferred embodiment of the invention.

In the drawings:

Fig. 1 is a vertical section through a preferred embodiment of the invention;

Fig. 2 is a partial section of the modified form;

Fig. 3 is a fragmentary section of a fold in the sealing member showing the pressure release slit in its closed position; and, Fig. 4 is a similar view showing the slit in its open position.

Referring to Fig. 1, the regulator therein illustrated is merely presented as a typical construction of a device embodying applicant's invention. The regulator has a body member 10 joined to a cap member 11, and a flexible diaphragm 12 is clamped between said members. Body member 10 and diaphragm 12 form the fluid or regulating chamber of the regulator. A suitable bracket 13 is provided for mounting the regulator. The regulator has an inlet pipe coupling 16 formed integrally with a valve seat 17 that may be closed by a movable valve member 18.

The valve member is actuated by a bell crank 19 pivoted to the valve member as at 21 and the regulator housing as at 22. The other end 23 of the bell crank is mounted by knife edges within a post member 24 connected to the diaphragm 12 so that motion of the diaphragm opens and closes the valve that controls admission of fluid to the lower chamber. A suitable outlet fitting or nipple 25 is provided in the lower chamber for connection to the remainder of the system. The valve is urged toward its closed position by an external spring 26 engaging the diaphragm at one end and an adjusting nut 27 at the other. The adjusting nut is threaded into a sleeve 28 fastened to a protective cap 11, which sleeve may be closed by a cap nut 29.

If the regulator embodies a relief valve, it may be in the form of a bolt 31 connected to post 24 and the latter element will have a valve seat 32 formed thereon. A spring 33 engages washer 34 disposed against the diaphragm and a nut on bolt 31, thereby tending to hold valve seat 32 against the diaphragm. Suitable clearance is provided between the bolt 31 and the diaphragm, either by an enlarged hole in the diaphragm that receives the bolt or by providing flats on the bolt or both. If pressure beneath the diaphragm 12 exceeds a certain predetermined value the action on the diaphragm may lift the diaphragm relative to the valve seat 32 compressing springs 26 and 33 and relieving such excess pressure.

In order to provide atmospheric pressure on the upper or outside of the diaphragm 12, the cap 11, which serves as mechanical protection for the diaphragm, is provided with a vent member 36 which includes a vent port 37 so that the pressure within the cap 11 will substantially be equal to atmospheric pressure at all times.

Applicant's sealing member, in its preferred embodiment, comprises a boot 40 formed of natural or synthetic rubber or of other plastic or rubber-like material which is mounted on the assemblage of flanges 41 extending from the body and cap members 10 and 11. The edge of boot 40 may include a grooved rib portion as at 42 for resiliently gripping the flange assembly 41. In order that the sealing member 40 may be quite flexible and responsive to changes in atmospheric pressure as well as to fluctuations of the diaphragm 12, member 40 is ribbed as at 43 throughout its axial length so that it presents a flexible, corrugated wall to the action of pressure differentials between the inside and outside of the member 40. With this construction of the sealing member 40, it may respond to variations in atmospheric pressure as well as respond to fluctuations of the diaphragm 12, and due to the corrugations 43, it takes very little energy to cause such response.

If the regulator incorporates a relief valve structure, a suitable number of slits 44 may be formed in the folds of the ribs 43 and such slits will be maintained closed by the resilient action of the boot material at the substantially atmospheric pressures normally present within the boot. However, if excess pressure develops within the boot, as would occur if the relief valve were open, such pressure will be sufficient to open the slits somewhat, as indicated in Fig. 4, whereupon the excess pressure will escape through the slits without blowing off or tearing the boot. As soon as the pressure is relieved, the slits will again close automatically and the regulator will again be sealed. The action of the sealing boot 40, namely its response to fluctuations of the diaphragm 12 will not be materially altered, even if the device is exposed to the elements under sleet or icy conditions, because the constant fluctuations of the material of member 40 in response to the fluctuations of the diaphragm and changes in atmospheric pressure tend to break or flake sleet and ice that may form on the member 40. In the preferred form it can be seen that the volume of air enclosed by member 40 is relatively large so that even if the member does not exactly follow fluctuations of the diaphragm, any change in pressure within member 40 due to such fluctuations will be negligible.

The form shown in Fig. 2 has the same mode of operation as that shown in Fig. 1, except that the sealing member 40a is made smaller, and instead of being mounted on the flange assembly 41 sealing member 40a is frictionally mounted. The boot 40a has an annular collar or rib 46 that is normally smaller in diameter than spring housing 28 so that the collar can be stretched and slipped over the housing. In this construction, the upper cap 11a will not be vented, rather the cap nut 29a (or possibly sleeve 28) will be ported, which port may be closed by a protective screen 36a. In order to augment the flexibility of the sealing member 40a it is corrugated as at 43a, as in the preferred construction. If a relief valve is built into the regulator and is opened by pressure in the lower chamber, the boot 40a will merely be blown clear of the regulator and may be salvaged. If a relief valve is incorporated in the regulator and it is not desired to have the boot 40a be blown from the regulator or unduly stretched, pressure relief slits 44a may be formed in the folds of the corrugations 43a to act as explained in the description of Figs. 1, 3, and 4.

Having completed a detailed description of my invention it will be apparent that I have economically produced a sealed regulator having all the advantages of a vented regulator biased against atmospheric pressure with none of the disadvantages formerly attendant with such constructions in the form of admission of moisture, dirt, and other foreign matter, and interference with the regulator action due to freezing, sleet, ice, and the like.

Having completed a detailed description of the present invention so that others skilled in the art may be able to understand and practice the same, I state that what I desire to secure by Letters Patent is defined in what is claimed.

What is claimed is:

1. A sealed pressure regulator comprising a body including a casing having an opening, inlet and outlet ports in said casing, a valve for said inlet port, mechanism for opening and closing said valve, said mechanism comprising a diaphragm extending across said opening and forming with said casing a regulating chamber, valve operating means connected to said valve and to said diaphragm, and a spring engaging said mechanism and said body; a port in said diaphragm, a spring-biased relief valve closing said port, and a closure making sealed engagement with said body and disposed to form with said body and diaphragm a normally sealed chamber, said closure including a thin-walled circumferentially corrugated member of rubber-like material movable in response to pressure changes within said sealed chamber caused by fluctuation of said diaphragm whereby the volume of the chamber defined by said diaphragm, regulator body, and flexible closure remains substantially constant as said diaphragm flexes within said body, said closure being arranged to open said sealed chamber to atmosphere when pressure in said chamber increases by a predetermined amount above atmospheric pressure.

2. A sealed pressure regulator comprising a body including a casing having an opening, inlet and outlet ports in said casing, a valve for said inlet port, mechanism for opening and closing said valve, said mechanism comprising a diaphragm extending across said opening and forming with said casing a regulating chamber, valve operating means connected to said valve and to said diaphragm, a spring engaging said mechanism and said body, a port in said diaphragm, a spring-biased relief valve closing said port, and a closure making sealed engagement with said body and disposed to form with said body and diaphragm a normally-sealed chamber, said closure including a thin-walled circumferentially corrugated member of rubber-like material movable in response to pressure changes within said normally sealed chamber caused by fluctuation of said diaphragm whereby the volume of the chamber defined by said diaphragm, regulator body, and flexible closure remains substantially constant as said diaphragm flexes within said body, there being slits in the wall of said member held closed by the resiliency of the member when atmospheric pressure exists in said chamber, said member stretching to open said slits when pressure in said normally sealed chamber increases by a predetermined amount above atmospheric pressure.

3. A sealed pressure regulator comprising a body including a casing having an opening, inlet and outlet ports in said casing, a valve for said inlet port, mechanism for opening and closing said valve, said mechanism comprising a diaphragm extending over said opening forming with said casing a regulating chamber, valve operating means connecting said valve to said diaphragm, a port in said diaphragm, normally closed relief valve means closing said port adapted to open at a predetermined pressure, and a closure member making sealing engagement with said body and disposed to form with said body and diaphragm a normally sealed chamber, said closure member including a flexible member of rubber-like material movable in response to pressure changes within said sealed chamber caused by fluctuations of said diaphragm whereby the volume of the chamber defined by said diaphragm, regulator body and flexible closure remain substantially constant as said diaphragm flexes within said body, said body including a cover member between said diaphragm and said closure member, said cover member being provided with vent means opening into said closure member, said closure member being arranged to open said sealed chamber to atmosphere when the pressure in said sealed chamber increases by a predetermined amount above atmospheric pressure.

4. A sealed pressure regulator as defined in claim 3 wherein said cover member includes a sleeve and said closure member resiliently engages said sleeve forming a frictional seal therebetween.

5. A sealed pressure regulator as defined in claim 3 wherein said closure member is formed with resiliently closed valve means arranged to open when the pressure in said sealed chamber increases to said predetermined amount above atmospheric pressure.

References Cited in the file of this patent

UNITED STATES PATENTS

| Number | Name | Date |
| --- | --- | --- |
| Re. 5,431 | Field | June 3, 1873 |
| 1,359,631 | Teed | Nov. 23, 1920 |
| 1,837,970 | Jones | Dec. 22, 1931 |
| 2,147,850 | MacLean | Feb. 21, 1939 |
| 2,208,261 | Jackson | July 16, 1940 |
| 2,295,767 | Wiggins | Sept. 15, 1942 |
| 2,306,746 | Niesemann | Dec. 29, 1942 |
| 2,312,679 | Speth | Mar. 2, 1943 |

FOREIGN PATENTS

| Number | Country | Date |
| --- | --- | --- |
| 694,809 | France | Sept. 22, 1930 |